United States Patent
Azanza Ladrón et al.

(10) Patent No.: US 12,373,837 B2
(45) Date of Patent: Jul. 29, 2025

(54) FINANCIAL OPERATION AUTHORIZATIONS

(71) Applicant: VERIDAS DIGITAL AUTHENTICATION SOLUTIONS, S.L., Tajonar (ES)

(72) Inventors: Eduardo Azanza Ladrón, Tajonar (ES); Miguel Ángel Sánchez Yoldi, Tajonar (ES); Leire Arbona Puértolas, Tajonar (ES); Francisco Julián Zamora Martínez, Tajonar (ES); Jose Luis González De Suso Molinero, Tajonar (ES)

(73) Assignee: VERIDAS DIGITAL AUTHENTICATION SOLUTIONS, S.L., Tajonar (ES)

( * ) Notice: Subject to any disclaimer, the term of this patent is extended or adjusted under 35 U.S.C. 154(b) by 340 days.

(21) Appl. No.: 18/025,514

(22) PCT Filed: Jan. 14, 2021

(86) PCT No.: PCT/EP2021/050729
§ 371 (c)(1),
(2) Date: Mar. 9, 2023

(87) PCT Pub. No.: WO2021/156035
PCT Pub. Date: Aug. 12, 2021

(65) Prior Publication Data
US 2023/0325836 A1  Oct. 12, 2023

(30) Foreign Application Priority Data

Feb. 7, 2020 (EP) .................................... 20382083
Oct. 27, 2020 (EP) .................................... 20382933

(51) Int. Cl.
G06Q 20/40 (2012.01)
G06Q 20/10 (2012.01)
G06Q 20/32 (2012.01)

(52) U.S. Cl.
CPC ... *G06Q 20/40145* (2013.01); *G06Q 20/1085* (2013.01); *G06Q 20/3274* (2013.01)

(58) Field of Classification Search
None
See application file for complete search history.

(56) References Cited

U.S. PATENT DOCUMENTS

| 10,373,148 B1 | 8/2019 | Dixon et al. |
| 2012/0138679 A1* | 6/2012 | Doyle .............. G06K 19/06037 235/494 |

(Continued)

OTHER PUBLICATIONS

International Search Report and Written Opinion of the International Searching Authority issued in PCT International Application No. PCT/EP2021/050729 mailed Mar. 18, 2021.

*Primary Examiner* — Paul S Schwarzenberg
(74) *Attorney, Agent, or Firm* — SQUIRE PATTON BOGGS (US) LLP

(57) ABSTRACT

A method for authorizing a financial operation is disclosed, the method comprising: receiving operation data related to a financial operation; obtaining a first biometric mathematical representation of a user; storing an operation mathematical representation representing operation data and the first biometric mathematical representation in an authorization dataset; receiving the authorization dataset; obtaining the operation mathematical representation and the first biometric mathematical representation from the received authorization dataset; receiving a capture of a second image of the user; generating a second biometric mathematical representation of a user; determining a matching score by comparing the first biometric mathematical representation and the second (Continued)

biometric mathematical representation; authenticating an identity of the user; obtaining the operation data from the operation mathematical representation; and authorizing the financial operation if the identity is authenticated and the operation data are satisfied.

18 Claims, 4 Drawing Sheets

(56) References Cited

U.S. PATENT DOCUMENTS

| | | | |
|---|---|---|---|
| 2012/0173311 A1 | 7/2012 | Chang et al. | |
| 2014/0058943 A1* | 2/2014 | Glencross | G06Q 20/1085 |
| | | | 705/43 |
| 2014/0372128 A1* | 12/2014 | Sheets | G06Q 20/20 |
| | | | 704/273 |
| 2015/0088674 A1* | 3/2015 | Flurscheim | G06Q 20/326 |
| | | | 705/17 |
| 2018/0121926 A1* | 5/2018 | Sharma | G06Q 20/3274 |
| 2020/0090161 A1* | 3/2020 | Hay | G06K 7/1413 |
| 2023/0087357 A1* | 3/2023 | Phillips | G06Q 20/3274 |
| | | | 235/379 |
| 2023/0115843 A1* | 4/2023 | Phillips | G06Q 20/1085 |
| | | | 235/379 |
| 2023/0376919 A1* | 11/2023 | Hill | G07F 19/203 |

* cited by examiner

FINANCIAL OPERATION AUTHORIZATIONS

CROSS-REFERENCE TO RELATED APPLICATIONS

This application is a U.S. national-stage filing under 35 USC 371 (c) of International Application No. PCT/EP2021/050729, filed Jan. 14, 2021, which claims the benefit of European Patent Application No. EP20382933.8, filed on Oct. 27, 2020 and the European Patent Application No. EP20382083.2 filed on Feb. 7, 2020. The entire contents of these applications are incorporated by reference herein in their entirety for all purposes.

The present disclosure relates to methods and systems for authorizing a financial operation. The present disclosure further relates to automated teller machines.

BACKGROUND

It is widely known to perform some financial operations or transactions through electronic devices such as smartphones, tablets, laptop, smartwatches, computers, automated teller machines (ATM) or the like. Some of the most common and used operations by the customers or users are related to withdrawing money, e.g. from a bank account or remittances or transfers. From the customers point of view, obtaining the money may be both stressful and risky, and generally not very positive. Examples may be provided by operating at an ATM site or a remittance receiving office.

By way of example and in the following, some drawbacks or features involved in withdrawing money from the ATM are set forth:
  Slow: withdrawing money from an ATM may take 3-5 minutes.
  The user may be very exposed for a long time while performing the operations.
  The user must withdraw his/her wallet and card in public.
  Inserting and removing the card may be often difficult, and the card may be even retained in the ATM.
  There is a risk of non-authorized card duplication and card reading. Credit card skimmers to capture credit card info may be installed at the ATMs to impersonate the user and withdraw money from their accounts.
  The PIN may be entered in public, i.e. possibility of spies.
  ATM's operating system (OS) is not the same in all bank entities. The operating systems may be old and slow which may increase even more the duration of the operation.
  Operation may be especially tense in street level ATMs.
  Cards may be forgotten in the ATM.
  Performing operations may involve touching buttons or displays. The surfaces to be touched may be polluted with pathogenic microorganisms, such as COVID-19 virus. So, there may be a risk for the health of the user.

A similar case may be depicted, mutatis mutandis, when it comes to remittances. The user has to withdraw his/her money generally away from banks which may involve an even more risky situation than ATM's. Furthermore, premises where remittances are withdrawn may have no technical support from banks or the like which may make the operation much more unsafe and uncertain.

Therefore, there is a need for further improvements in performing financial operations. The present disclosure aims to provide methods and systems related to the authorization of a financial operation that avoid or at least reduce drawbacks of the prior art solutions. More particularly, the present disclosure also aims to provide methods and systems related to the authorization of a financial operation in an ATM that avoid or at least reduce drawbacks of the prior art solutions.

SUMMARY

In a first aspect, a method for authorizing a financial operation is provided. The method comprises receiving operation data related to a financial operation. The method further comprises obtaining a first biometric mathematical representation of a user, the first biometric mathematical representation being obtained from a first image of the user, storing an operation mathematical representation representing operation data and the first biometric mathematical representation in an authorization dataset, receiving the authorization dataset, obtaining the operation mathematical representation and the first biometric mathematical representation from the received authorization dataset, receiving a capture of a second image of the user, generating a second biometric mathematical representation of a user, the second biometric mathematical representation being obtained from the captured second image, determining a matching score by comparing the first biometric mathematical representation and the second biometric mathematical representation, authenticating an identity of the user if the determined matching score satisfies a predefined threshold, obtaining the operation data from the operation mathematical representation, authorizing the financial operation if the identity is authenticated and the operation data are satisfied.

The user may enter the data operation and authenticate the financial operation through an app or web of the bank or remittance entity. These actions may be considered as sensible in terms of security and they may be performed away from the ATM or remittance site, for instance at home. Therefore, the operation may be performed, at least partially, upstream or away from the site. As in some examples the financial operation may comprise withdrawing money, the withdrawing may be carried out, at least partially, upstream. The part of the operation involving at least the physical withdrawal of money may be performed in the withdrawing-money site, i.e. downstream.

The withdrawing-money site may be an ATM site, a remittance/transfer office or the like.

The identity of the user may be authenticated and the operation data may be obtained when the user performs the financial operation out of the withdrawing-money site. Therefore, the method above may reduce the time that a user spends to the maximum, for instance less than ten seconds. This may mean an improved user experience.

The authorization dataset may be carried as an image in the wallet, or printed on a piece of paper, which may allow the user to go to the site to physically withdraw money without any card, intelligent device, etc. Although the authorization dataset may be carried as an image in the mobile there is no need to carry an intelligent mobile device to perform the financial operation.

The authorization dataset may act as a token, particularly an operation biometric token to complete the financial operation at the withdrawing-money site. The authorization dataset may work as a unique, dynamic, one-single use token, which may contain the operation mathematical representation and biometric details of the person authorized to perform the financial operation.

As the user does not need to carry his/her credit card to the withdrawing-money site, they do not need to withdraw his/her wallet and card in public. Therefore, the security may be enhanced.

Private and dynamic, i.e. unique, biometric credentials with the content of the financial operation may be generated.

As the financial operation may be authenticated prior to reach the withdrawing-money site, the biometric verification at the withdrawing-money site may be done in a simpler biometric mode, for instance without proof of life or asking the user for movements or actions to verify he/she is alive.

Although the method may allow to use facial biometrics at the withdrawing-money site, the method may be carried out with a webcam or the like integrated in a capturing device placed at the withdrawing-money site. This webcam does not need to be specifically designed or purposed to capture biometrics. So, it is not necessary to use complex and high-cost cameras.

The financial operation may be done with a double factor: "something the user has" i.e. authorization dataset and "something the user is", namely his/her facial biometrics.

The capturing device at the withdrawing-money site does not need to store any biometric data because it may be contained in the authorization dataset.

The user does not need to touch any button or user interface of the capturing device of the withdrawing-money site. The method may be carried out without touching the capturing device, so the risk of touching surfaces polluted with pathogenic microorganisms such as COVID-19 may be avoided or at least reduced.

A financial operation performed according to the method of the first aspect may be carried out with a significant degree of privacy. In the event that the user loses the authorization dataset and an unauthorized person tries to use it, this unauthorized person will not be able to perform the financial operation because the biometrics related to the authorization dataset will not match those of the legitimate user. Furthermore, the unauthorised person cannot know the operation data because it may be part of the operation mathematical representation. Therefore, the unauthorised person cannot use the authorization dataset in a random withdrawing-money site if, for example, the identification data of a certain withdrawing-money site are part of the operation data. Moreover, the unauthorised person cannot change the data of the authorization dataset, because it may have measures of integrity. For example, the authorization dataset may be digitally signed.

A biometric mathematical representation may be, for instance, a biometric vector or a biometric matrix. A biometric vector may be a numerical string extracted from a biometric feature (e.g. facial image).

The numerical string may be extracted through a biometric engine. The biometric engine may provide a biometric mathematical representation using different automatic means, such as machine learning techniques.

The biometric vector may be a series of numbers that do not represent any faction of the person's face, may be irreversible so it may be practically impossible to go back to the original photo. A version of the biometric engine may also be included in the biometric mathematical representation. In examples, the biometric vector can only be deciphered by the same version of the biometric engine that generated it.

Regarding the example of withdrawing money at a remittance office, and thanks to the above method, the exposure of the user in the remittance office may be minimized. Furthermore, the user has not to share any sensible data, document or card with other people.

In a further aspect, a method for authorizing a financial operation in an automated teller machine is provided. The method comprises receiving operation data related to a financial operation. The method further comprises obtaining a first biometric mathematical representation of a user, the first biometric mathematical representation being obtained from a first image of the user, storing an operation mathematical representation representing operation data and the first biometric mathematical representation in an authorization dataset, receiving the authorization dataset, obtaining the operation mathematical representation and the first biometric mathematical representation from the received authorization dataset, receiving a capture of a second image of the user, generating a second biometric mathematical representation of a user, the second biometric mathematical representation being obtained from the captured second image, determining a matching score by comparing the first biometric mathematical representation and the second biometric mathematical representation, authenticating an identity of the user if the determined matching score satisfies a predefined threshold, obtaining the operation data from the operation mathematical representation, authorizing the financial operation in the automated teller machine if the identity is authenticated and the operation data are satisfied.

Similar advantages as the method of the first aspect may be associated with this further method. In the examples of this further aspect, the money-withdrawing site may be an ATM site and the capturing device may be the ATM.

The user may enter the data operation and authenticate the financial operation through an app or web of the bank. These actions may be performed away from the ATM site, for instance at home. Therefore, the financial operation may be performed, at least partially, upstream or away from the ATM site, i.e. a capturing device of a withdrawing-money site. As in some examples the financial operation may comprise withdrawing money from the automated teller machine, the withdrawing may be carried out, at least partially, upstream. The part of the financial operation involving at least the physical withdrawal of money may be performed in the ATM site, i.e. downstream.

The identity of the user may be authenticated and the operation data may be obtained when the user performs the operation out of the ATM. Therefore, the method above may reduce the time that a user spends in the ATM to the maximum, for instance less than ten seconds. This may mean an improved user experience.

The authorization dataset may be carried as an image in the wallet, or printed on a piece of paper, which may allow the user to go to the ATM without any card, intelligent device, etc. Although the authorization dataset may be carried as an image in the mobile there is no need to carry an intelligent mobile device to perform the operation.

As the user does not need to carry his/her credit card to the ATM site, they do not need to withdraw his/her wallet and card in public. A risk of non-authorized card duplication and card reading or obtaining the PIN, for instance through a card skimmer, may be avoided or at least reduced. Furthermore, the user does not need to shield the keypad of the ATM. Therefore, the fraud may be reduced, and the security may be enhanced.

Moreover, the insertion and removal of the card is avoided and thus the card cannot be retained or forgotten in the ATM. The user cannot be deprived of his/her card.

As the financial operation may be authenticated prior to reach the ATM, the biometric verification at the ATM may be done in a simpler biometric mode, for instance without proof of life or asking the user for movements or actions to verify he/she is alive.

Although the method may allow to use facial biometrics at the ATM, the method may be carried out with a webcam integrated in the ATMs. This webcam does not need to be specifically designed or purposed to capture biometrics. So, it is not necessary to use complex and high-cost cameras.

The ATM does not need to store any biometric data because it may be contained in the authorization dataset.

The user does not need to touch any button or user interface of the ATM. The method may be carried out without touching the ATM, so the risk of touching surfaces polluted with pathogenic microorganisms such as COVID-19 may be avoided or at least reduced.

An ATM operation performed according to the method of performing a financial operation in an ATM, may be carried out with a significant degree of privacy. In the event that the user loses the authorization dataset and an unauthorized person tries to use it, this unauthorized person will not be able to perform the financial operation because the biometrics related to the authorization dataset will not match those of the legitimate user. Furthermore, the unauthorised person cannot know the operation data because it may be part of the operation mathematical representation. Therefore, the unauthorised person cannot use the authorization dataset in a random ATM if, for example, the identification data of a certain ATM are part of the operation data. Moreover, the unauthorised person cannot change the data of the authorization dataset, because it may have measures of integrity. For example, the authorization dataset may be digitally signed.

In a further aspect, a system is provided for authorizing a financial operation. This system comprises an operation data receiving module, a first obtaining module, a storing module, an authorization dataset receiving module, a second obtaining module, a capture receiving module, a generating module, a determining module, an authenticating module, a third obtaining module and an authorizing module.

The operation data receiving module is configured to receive operation data related to a financial operation. The first obtaining module is configured to obtain a first biometric mathematical representation of a user, the first biometric mathematical representation being obtained from a first image of the user. The storing module is configured to store an operation mathematical representation representing operation data and the first biometric mathematical representation in an authorization dataset. The authorization dataset receiving module is configured to receive the authorization dataset. The second obtaining module is configured to obtain the operation mathematical representation and the first biometric mathematical representation from the received authorization dataset. The capture receiving module is configured to receive a capture of a second image of the user. The generating module is configured to generate a second biometric mathematical representation of a user, the second biometric mathematical representation being obtained from the captured second image. The determining module is configured to determine a matching score by comparing the first biometric mathematical representation and the second biometric mathematical representation. The authenticating module is configured to authenticate an identity of the user if the determined matching score satisfies a predefined threshold. The third obtaining module is configured to obtain the operation data from the operation mathematical representation. The authorizing module is configured to authorize the financial operation if the identity is authenticated and the operation data are satisfied.

Since this system for authorizing a financial operation may be suitable for performing the above methods for authorizing a financial operation, e.g. a financial operation in an automated teller machine or a remittance/transfer office, same or similar principles and advantages as those commented with respect to said methods may be attributed to such systems for authorizing.

In a further aspect, a capturing device in data communication with a system according to any of herein disclosed examples, is disclosed. In some examples, the capturing device may comprise an automated teller machine.

In a further aspect, a non-transitory computer program product is disclosed. The non-transitory computer program product may cause a processor to authorize a financial operation. The non-transitory computer program product may have instructions to perform a method for authorizing a financial operation according to some examples disclosed herein.

In a further aspect, a computer program product is disclosed. The computer program product may comprise program instructions for causing a computing system to perform a method for authorizing a financial operation according to some examples disclosed herein.

The computer program product may be embodied on a storage medium (for example, a CD-ROM, a DVD, a USB drive, on a computer memory or on a read-only memory) or carried on a carrier signal (for example, on an electrical or optical carrier signal).

The computer program may be in the form of source code, object code, a code intermediate source and object code such as in partially compiled form, or in any other form suitable for use in the implementation of the processes. The carrier may be any entity or device capable of carrying the computer program.

For example, the carrier may comprise a storage medium, such as a ROM, for example a CD ROM or a semiconductor ROM, or a magnetic recording medium, for example a hard disk. Further, the carrier may be a transmissible carrier such as an electrical or optical signal, which may be conveyed via electrical or optical cable or by radio or other means.

When the computer program is embodied in a signal that may be conveyed directly by a cable or other device or means, the carrier may be constituted by such cable or other device or means.

Alternatively, the carrier may be an integrated circuit in which the computer program is embedded, the integrated circuit being adapted for performing, or for use in the performance of, the relevant methods.

In a still further aspect, a computing device is disclosed. The computing device comprises a memory and a processor, embodying instructions stored in the memory and executable by the processor, the instructions comprising functionality to execute a method according to any of herein disclosed examples.

In a yet further aspect, a capturing device is disclosed. The capturing device is capable of establishing a data communication with a computing device according to any of herein disclosed examples. In some examples, the capturing device may comprise an ATM.

In the present disclosure, the expression automated teller machine and the acronym ATM may be used indistinctly.

Throughout the present disclosure, a dataset may be understood as a set of data, a computer file or the like.

Throughout the present disclosure, biometrics may refer to metrics related to human body characteristics.

Throughout the present disclosure, the term "module" may be understood to refer to software, firmware, hardware, and/or various combinations thereof. It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the described particular module.

Moreover, the modules may be implemented across multiple devices (associated or linked to the system for authorizing a financial operation) and/or other components that may be local or remote to one another. Additionally, the modules may be moved from one device and added to another device, and/or may be included in both devices (associated to the system for authorizing a financial operation). Any software implementations may be tangibly embodied in one or more storage media, such as e.g. a memory device, a floppy disk, a compact disk (CD), a digital versatile disk (DVD), or other devices that may store computer code.

BRIEF DESCRIPTION OF THE DRAWINGS

Non-limiting examples of the present disclosure will be described in the following, with reference to the appended drawings, in which.

DETAILED DESCRIPTION OF EXAMPLES

Figure 1:
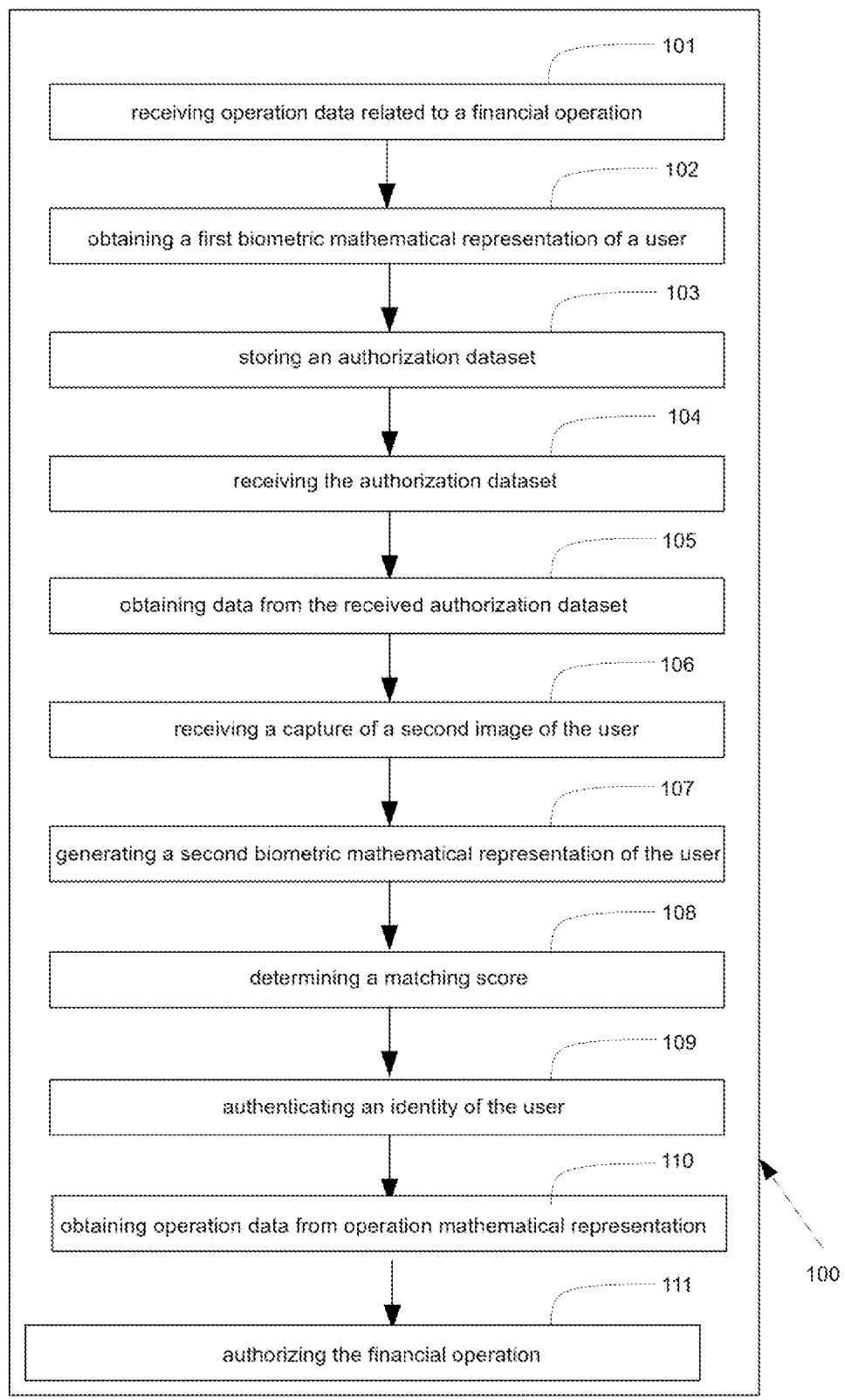
FIG. 1 is a flow chart of a method for authorizing a financial operation, according to an example.

FIG. 1 is a flow chart of a method for authorizing a financial operation 100, according to an example. Although FIG. 1 shows a specific sequence, it should be understood that other sequences may be followed not deviating from the scope of the present disclosure. As seen in FIG. 1, the method 100 comprises:
- receiving 101 operation data related to a financial operation;
- obtaining 102 a first biometric mathematical representation 51 of a user, the first biometric mathematical representation being obtained from a first image of the user;
- storing 103 an operation mathematical representation 52 representing operation data and the first biometric mathematical representation 51 in an authorization dataset 5. The operation mathematical representation 52 may be a hash value obtained through a mathematical function. The hash function applied in the present disclosure may be chosen from those available in the art. The authorization dataset 5 may be digitally signed;
- receiving 104 the authorization dataset 5;
- obtaining 105 the operation mathematical representation and the first biometric mathematical representation from the received authorization dataset;
- receiving 106 a capture of a second image of the user;
- generating 107 a second biometric mathematical representation of a user, the second biometric mathematical representation being obtained from the captured second image;
- determining 108 a matching score by comparing the first biometric mathematical representation and the second biometric mathematical representation;
- authenticating 109 an identity of the user if the determined matching score satisfies a predefined threshold;
- obtaining 110 the operation data from the operation mathematical representation;
- authorizing 111 the financial operation if the identity is authenticated and the operation data are satisfied. The operation data may be satisfied, for instance, when the financial operation meets all or part of the received operation data.

The operation data may be obtained by the system 10 on the basis of the operation mathematical representation from the received authorization dataset. In examples, the hash value of the operation mathematical representation 52 may be obtained by the system 10.

Figure 2:
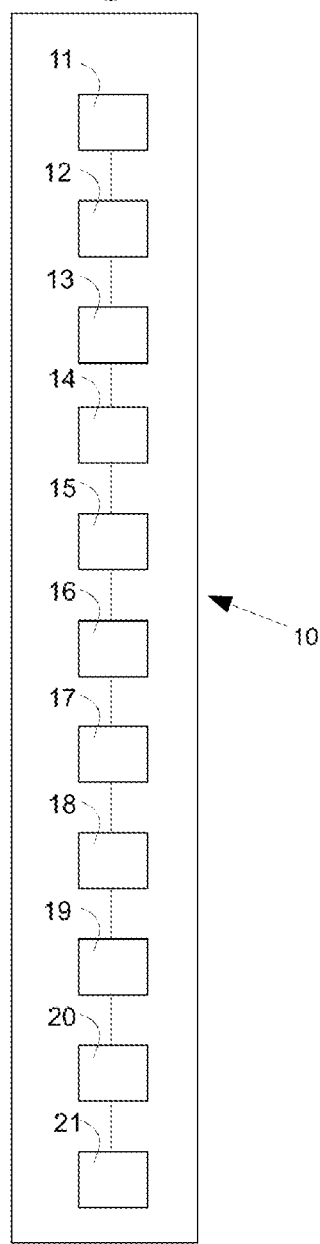
FIG. 2 schematically illustrates a system for authorizing a financial operation, according to an example.
Figure 3:
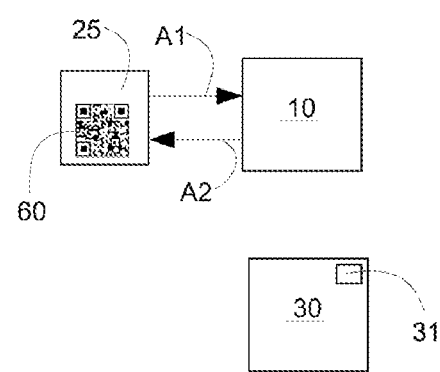
FIG. 3 schematically illustrates an example of arrangement of devices involved in authorizing a financial operation where two devices are in data communication.
Figure 4:
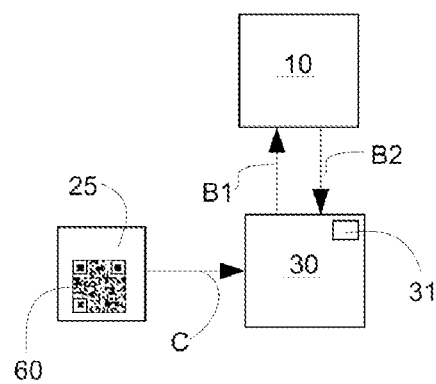
FIG. 4 schematically illustrates the devices of the example of arrangement of FIG. 3 where a further data communication is shown.

Features of the method for authorizing a financial operation 100 and a system for authorizing a financial operation 10 will be explained in an example of operation. Regarding the system 10, it can be shown in FIGS. 2 to 4. Particularly, FIG. 2 schematically illustrates a system for authorizing a financial operation 10, according to an example. FIG. 3 schematically illustrates an example of arrangement of devices involved in authorizing a financial operation where two devices are in data communication. FIG. 4 schematically illustrates the example of arrangement of FIG. 3 where a further data communication is shown.

In some examples, the operation data may comprise at least one of the elements: a timeslot to perform the operation, and/or an amount of money, and/or identification data of a capturing device to perform the operation, e.g. data of an automated teller machine to perform the operation, and/or a particular location area (i.e.: a neighbourhood, a town or a city). A capturing device 30 may be chosen by the user through the user interface of the device 25, or automatically chosen by the system 10, for instance, taking into account location of the device 25 or even the identification data of the capturing device may be left void.

The ATM 30 may be an example of capturing device 30. However, a capturing device may comprise a suitable electronic device. In some examples, the capturing device may comprise a camera and a user interface, and may be capable of data communication with some devices.

Regarding the elements of the operation data and by way of example, the financial operation data may be met and so the operation data may be satisfied, when the operation is carried out within the timeslot introduced by the user or system 10, and/or the introduced amount of money can be delivered to the user through the capturing device 30 or the like, and/or the capturing device 30 is the introduced one through the user interface, or the capturing device may be chosen by the system 10 or is located within a particular area.

In examples of the method for authorizing a financial operation 100, receiving operation data may comprise receiving one or more elements of the operation data filled through a user interface. At least one of the operation data may be introduced by the user through a user interface, e.g. a SDK of the bank running in a user's device 25.

According to examples of the method 100, the financial operation may comprise withdrawing money from the automated teller machine 30. Other operations may be envisaged as well, such as a remittance, transfer or depositing money.

In examples of the method 100, the first biometric mathematical representation may be obtained from a database. The database may comprise a biometric vector of the user or users. In this example, the generation of the first vector may be done previously. For example, a user may have done a digital onboarding process with his/her bank or service supplier. At that moment, the user may deliver his/her selfie to the bank or service supplier, and the bank may store the photo and the biometric vector in the database related to the system 10. In this way, if the user wants to carry out the financial operation, and therefore the herein disclosed methods, the first biometric mathematical representation of the user may be taken from a database related to system 10.

According to some examples of the method 100, the authorization dataset 5 may be an encrypted authorization dataset. The encryption may enhance the security of the operation.

In some examples, the method 100 may comprise verifying a digital signature of the authorization dataset. The authorization dataset 5 may be digitally signed and the verification of the digital signature may enhance the security of the operation.

In some examples, the method 100 may further comprise storing the authorization dataset 5 in a physical medium or electronic device 25. The physical medium may be a card, a piece of paper, or any other document.

Figure 5:
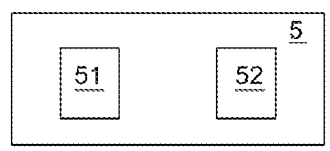
FIG. 5 schematically illustrates a block related to an example of an authorization dataset.

According to some examples, storing the authorization dataset may comprise:
 generating a machine-readable optical label that may carry the authorization dataset 5;
 providing the machine-readable optical label to the physical medium or electronic device 25. Although in FIG. 3 the machine-readable optical label is provided in the device 25, the optical label may be provided in a physical medium such as a piece of paper or the like. When the optical label is provided to the device 25, the label may be displayed when needed. FIG. 5 schematically illustrates a block related to an example of an authorization dataset 5.

In examples of the method 100, generating a machine-readable optical label may comprise generating a two-dimensional barcode.

Figure 6:
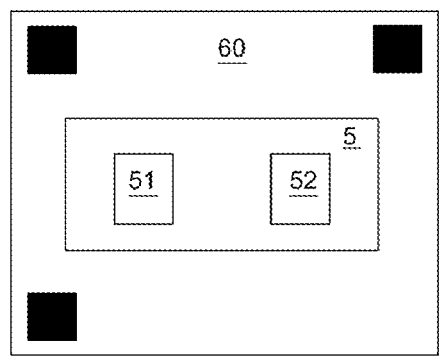
FIG. 6 schematically illustrates a block related to an example of a machine-readable optical label comprising the example of authorization dataset of FIG. 5.

According to some examples, generating a two-dimensional barcode may comprise generating a quick-response code 60. This feature can be seen in FIG. 6 that schematically illustrates a block related to an example of a machine-readable optical label comprising the example of authorization dataset of FIG. 5. The example of machine-readable optical label in FIG. 6 is a quick-response code 60.

In examples, the two-dimensional barcode may further comprise a barcode.

In some examples, the received authorization dataset 5 may be captured by/through the capturing device 30, such as the automated teller machine. The capture of the authorization dataset 5 by the capturing device 30 may be performed automatically when the user brings his/her authorization dataset 5 in front of the camera 31 of the capturing device 30. This way the user may avoid touching the capturing device 30.

In examples of the method 100, the received second image of the user may be captured by/through the capturing device 30 e.g. automated teller machine. In this case, the capture of the second image of the user may be performed automatically by the capturing device 30. In examples, the system 10 may send a command to the capturing device 30 so as to perform the capture by means of the camera 31. This also applies in the case where the system 10 and the capturing device 30 are, at least partially, integrally made.

The feature receiving 104 the authorization dataset may further comprise obtaining the authorization dataset 5 from the electronic device 25 through a wireless protocol. The authorization dataset 5 may be received by means of the capturing device 30 and then sent to the system 10. This also applies in the case where the system 10 and the capturing device 30 are, at least partially, integrally made.

The wireless protocol may comprise Bluetooth, Wi-Fi, NFC (Near Field Communication) and so on. This may mean that the authorization dataset 5 delivered to the user may be emitted from the electronic device 25 of the user taking advantage of the wireless technology. The electronic device 25 may be also a chip with communication capabilities, so that the authorization dataset 5 may be obtained from the electronic device 25 through the above-mentioned wireless protocol.

According to some examples, the first or the second biometric mathematical representations may be obtained from a first or second image of one or more users. A group of people may be empowered to carry out a financial operation related, for instance, to the same account. The group of people may be a couple, a family, etc. or may belong to the same organization, company, etc. In these cases, an authorization for a single person may be enough to perform the operation at the capturing device 30 since it may be not necessary to identify each person of the group of people.

In some examples, the method 100 may comprise verifying a digital signature of the authorization dataset. If the signature is positively verified, then the process may be allowed to go on. This action may be performed by the system 10 in a dedicated module.

In examples, the method 100 may further comprise sending a confirmation of the operation once performed. The user may receive the confirmation through his/her device to inform about the successful task. The confirmation may be sent to all the users of an authorized group as herein disclosed.

According to some examples, the method 100 may further comprise receiving a report on a fraud. This may apply when the user or users receive the confirmation and the operation has not been dully authorized.

It can be seen in FIG. 2 that the system for authorizing a financial operation 10 comprises:
 an operation data receiving module 11 configured to receive operation data related to a financial operation;
 a first obtaining module 12 configured to obtain a first biometric mathematical representation 51 of a user, the first biometric mathematical representation being obtained from a first image of the user;
 a storing module 13 configured to store an operation mathematical representation 52 representing operation data and the first biometric mathematical representation 51 in an authorization dataset 5;
 an authorization dataset receiving module 14 configured to receive the authorization dataset 5;
 a second obtaining module 15 configured to obtain the operation mathematical representation 52 and the first biometric mathematical representation 51 from the received authorization dataset 5;

a capture receiving module 16 configured to receive a capture of a second image of the user;

a generating module 17 configured to generate a second biometric mathematical representation of a user, the second biometric mathematical representation being obtained from the captured second image;

a determining module 18 configured to determine a matching score by comparing the first biometric mathematical representation and the second biometric mathematical representation;

an authenticating module 19 configured to authenticate an identity of the user if the determined matching score satisfies a predefined threshold;

a third obtaining module 20 configured to obtain the operation data from the operation mathematical representation;

an authorizing module 21 configured to authorize the financial operation if the identity is authenticated and the operation data are satisfied.

The system 10 may be embodied as computing system e.g. physical computer or cloud-computing or as an on-premises software.

According to an aspect, a capturing device 30 in data communication with a system 10 according to any of herein disclosed examples, is disclosed. In examples, the capturing device 30 and the system 10 may be, at least partially, integrally made. In some examples, the capturing device 30 may comprise an ATM.

According to an aspect, a non-transitory computer program product that causes a processor to authorize a financial operation, is disclosed. The non-transitory computer program product having instructions to:

receive operation data related to a financial operation;

obtain a first biometric mathematical representation 51 of a user, the first biometric mathematical representation 51 being obtained from a first image of the user;

store an operation mathematical representation 52 representing operation data and the first biometric mathematical representation 51 in an authorization dataset 5;

receive the authorization dataset 5;

obtain the operation mathematical representation 52 and the first biometric mathematical representation 51 from the received authorization dataset 5;

receive a capture of a second image of the user;

generate a second biometric mathematical representation of a user, the second biometric mathematical representation being obtained from the captured second image;

determine a matching score by comparing the first biometric mathematical representation and the second biometric mathematical representation;

authenticate an identity of the user if the determined matching score satisfies a predefined threshold;

obtain the operation data from the operation mathematical representation;

authorize the financial operation if the identity is authenticated and the operation data are satisfied.

According to an aspect, a computer program product comprising program instructions for causing a computing system to perform a method according to any of herein disclosed methods is disclosed. The computer program product may be embodied on a storage medium or may be carried on a carrier signal.

An example of implementation of the method for authorizing a financial operation 100 will set forth in the following in connection with a system 10 as per FIG. 2.

The system for authorizing a financial operation 10 as shown in FIGS. 2 to 4, may be exemplarily implemented as a computing device comprising a memory and a processor, embodying instructions stored in the memory and executable by the processor. The instructions may comprise functionality to execute the method for authorizing a financial operation 100 according to any of herein disclosed examples. The system 10 may be the same as above depicted so no further details may be provided.

According to an aspect, a capturing device 30 capable of establishing a data communication with a herein disclosed computing device as the system 10, is disclosed. The capturing device 30 may comprise an ATM.

The system 10 may be connected directly or wirelessly with the capturing device 30.

The system 10 may be connected directly or wirelessly with a client's electronic device 25, e.g. an electronic portable device.

Device 25 may be operated by a user, a final client, a person to perform the financial operation at the money-withdrawing site. The device 25 may act as platform to run a software development kit (SDK). The SDK may be a user's interface.

The data communication of the capturing device 30 with the computing device as the system 10 may be directly implemented or implemented through a gateway.

In some examples, the system 10 and the capturing device 30 may be implemented, at least partially, in the same apparatus, i.e. integrally formed.

In FIG. 3, a first communication from the device 25 to the system 10 has been illustrated with the reference number A1. A second communication A2 from the system 10 to the device 25 has been also illustrated. Communications A1, A2 may be implemented as a single channel for both directions, i.e. from and towards the device 25 or each communication may have its own channel. In FIG. 4, a first communication from the capturing device 30 to the system 10 has been illustrated with the reference number B1. A second communication B2 from the system 10 to the capturing device 30 has been also illustrated. Communications B1, B2 may be implemented as a single channel for both directions, i.e. from and towards the capturing device 30 or each communication may have its own channel. Communications A1, A2, B1, B2 may be encrypted and may be transmitted through secure channels.

Although communications A1, A2 and B1, B2 have been illustrated in different figures, in some examples they may occur substantially simultaneously.

In the following, examples of methods and systems for authorizing a financial operation are described related to an ATM. However, the financial operation may be performed related to a remittance.

Figure 7:
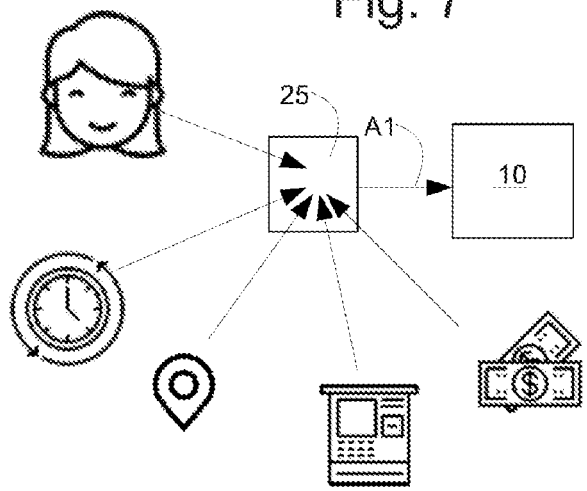
FIGS. 7 to 9 schematically illustrate some actions related to an example of ATM operation.
Figure 8:
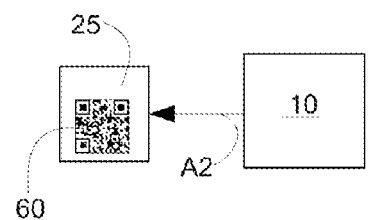
Figure 9:
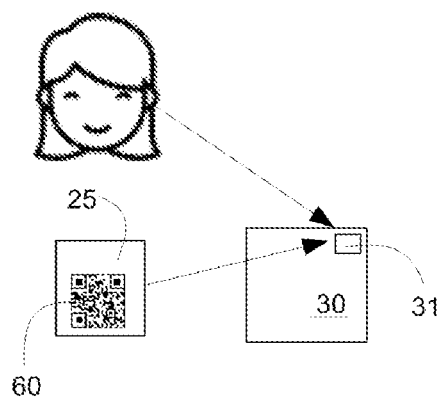

FIGS. 7-9 schematically illustrate some actions related to an example of ATM operation. Particularly, FIG. 7 illustrates a user who may be prompted to take a selfie to obtain the first biometric mathematical representation, and some elements of the operation data that may be introduced by the user through his/her device 25. Although FIG. 7 illustrates the four elements of some examples, the operation data may be at least one of them or even more than four. FIG. 8 illustrates the device 25 with the authorization dataset received from the system 10. FIGS. 7 and 8 may illustrate actions or parts of the ATM operation that may be performed away from the ATM site, for instance at home. Examples of FIGS. 7 and 8 may be located upstream regarding the financial operation. By way of example, actions or parts of FIGS. 7 and 8 may be performed at user's home. FIG. 9 illustrates the user who may be prompted to take a picture of his/her face through the camera 31 of the ATM 30, and the device 25 with the authorization dataset that may be captured by the camera 31. The example illustrated in FIG. 9 may be located downstream regarding the financial operation. The action or parts of FIG. 9 may be performed at the ATM site.

In an exemplary operating case, the system 10 may receive the operation data related to the operation, e.g. withdrawing money through the device 25. By way of example, the user may introduce a timeslot to perform the operation and/or an amount of money. The user may further introduce identification data of an automated teller machine to perform the operation. The user may further introduce a particular location area (i.e., a neighbourhood, a town or a city) to perform the operation. The system 10 may provide the user with the location of a particular ATM based on proximity, availability of the ATM, or a required amount of money and so on. FIG. 7 illustrates some related features. The operation data may be received by the operation data receiving module 11. The system 10 may choose the identification data of a particular ATM if, for instance, a particular amount of money may be provided only in some ATMs. This may save time and the exposure of the user.

The first biometric mathematical representation of the user may be obtained by the first obtaining module 12. The system 10 may be provided with a picture of the user from a database or the like and produce the mathematical representation by means of a biometric engine. In some examples, the first mathematical representation may be already available in a database. In the example of FIG. 7, the user is prompted to take a selfie to obtain the first biometric mathematical representation.

An authentication process such as FIDO (Fast Identity Online), OTP (One Time Password) or the like, may be performed before storing the authorization dataset.

The user may be an account holder or a person authorized to carry out the financial operation.

The operation mathematical representation and the first biometric mathematical representation may be stored in the authorization dataset through the storing module 13 of the system 10.

The authorization dataset may be provided to the user in the form of a machine-readable optical label, e.g. a quick-response code, that may carry the authorization dataset. The optical label may be stored in the user's electronic device or may be printed to be used without the user's electronic device. An example of this feature may be seen in FIG. 8.

The user may introduce the operation data and/or her/his identity may be verified out of the ATM site. This may be performed as illustrated by FIG. 3.

When the user reaches the ATM site, see for instance FIG. 4 or 9, he/she may show the machine-readable optical label as the authorization dataset 5. A camera 31 of the ATM may capture the optical label. The system 10 may receive the authorization dataset 5 in the form of the optical label through the authorization dataset receiving module 14.

The operation mathematical representation and the first biometric mathematical representation may be obtained from the received authorization dataset by means of the second obtaining module 15.

The system 10 may verify the digital signature that may be included in the authorization dataset. This verification may be performed by a dedicated module of the system.

A second image of the user may be captured by the camera 31 of the capturing device as illustrated in FIG. 9. The capture of the second image may be received by the capture receiving module 16.

Captures performed by the capturing device 30 in order to obtain information from the user and/or the authorization dataset 5 have been illustrated with reference C in FIG. 4. Reference C may also comprise a data communication between the device 25 and the capturing device 30.

The generating module 17 may generate the second biometric mathematical representation of the user from the captured second image.

The determining module 18 may determine the matching score related to the comparison of the first biometric mathematical representation and the second biometric mathematical representation. The identity of the user may be authenticated by the authenticating module 19 if the matching score satisfies the predefined threshold.

The operation data may be obtained from the operation mathematical representation 52 through the third obtaining module 20.

The financial operation may be authorized by the authorizing module 21 if the identity is authenticated and the operation data are satisfied. For instance, the money may be withdrawn from the ATM.

In some examples, the modules of the system such as the modules 15 to 21 may be located away from the money-withdrawing site, e.g. an ATM or remittance facility to enhance the security. The system 10 may send the authorization to perform the financial operation and the operation data obtained from the authorization dataset. This way, sensible data as biometric vector of the user does not have to be stored by the capturing device 30.

In some examples, the operation data may be checked at the money-withdrawing site. In this case, the capturing device 30 may receive information about the authorization of the operation from the system 10.

The user may receive a confirmation of the operation once performed. The confirmation may be sent by the system 10 through a dedicated module and received in the user's device 25. If the operation has been performed without consent of the user, he/she may send a report on or warning about a fraud through the user's interface. The later may be carried out automatically, for example if the operation has not been requested through a predefined user's device 25. The system 10 may receive the report by a dedicated module.

In the examples where the capturing device 30 and the system 10 may be, at least partially, integrally made, some scenarios may be envisaged:

The operation data may be substantially the same as the operation mathematical representation. In other words, the mathematical operation to obtain the mathematical representation may be to multiply the operation data by one. This way, the capturing device 30 may directly receive the operation data from the user and may decide whether the operation may be carried out or not.

The operation mathematical representation may represent a token of the operation data, which may be stored on the server, i.e. a part of the system 10, for example of the bank. In this way, once the user has authenticated himself biometrically in the capturing device 30, the capturing device 30 may take the token read (that is, it would take the operation mathematical representation) and ask a server to obtain the operation data related to that token. The capturing device 30 may obtain the operation data, and thus the decision to authorize or not the operation may be determined by the capturing device 30.

The operation mathematical representation may represent a token of the operation information that may be encrypted. The capturing device 30 may have the key to obtain the operation data from the token. A processor or the like may obtain the operation data with the key.

Regarding a case of withdrawing money associated with a remittance/transfer, the method 100 may be performed as in any other financial operation. The user may perform part of the financial operation away from the site or place where the physical withdrawal of money has to be done, i.e. upstream. As above mentioned, the operation data may be filled through a user interface provided in a user's device 25. Once the user has obtained the authorization dataset he/she may reach the remittance or transfer office to physically withdraw money, i.e. downstream. A capturing device 30 may be installed in the office, in data communication with system 10. By virtue of the capturing device 30, the system 10 may receive the authorization dataset and the second image of the user. The capturing device 30 may not store sensible information such as biometric data or user's private keys. The system 10 may send an authorization to the capturing device 30 to execute the financial operation if conditions are satisfied as herein disclosed. It is not necessary that the capturing device 30 is able to store or deliver bank notes or the like. In some examples, a message may be displayed for instance in the capturing device 30 so as to prompt an operator to provide the user with the amount. In some examples, the capturing device 30 may be in data or electric communication with an automated device to withdraw money.

Although only a number of examples have been disclosed herein, other alternatives, modifications, uses and/or equivalents thereof are possible. Furthermore, all possible combinations of the described examples are also covered. Thus, the scope of the present disclosure should not be limited by particular examples but should be determined only by a fair reading of the claims that follow. If reference signs related to drawings are placed in parentheses in a claim, they are solely for attempting to increase the intelligibility of the claim and shall not be construed as limiting the scope of the claim.

Further, although the examples described with reference to the drawings comprise computing apparatus/systems and processes performed in computing apparatus/systems, the invention also extends to computer programs, particularly computer programs on or in a carrier, adapted for putting the system into practice.

The invention claimed is:

1. A computer-implemented method for authorizing a physical financial operation, the method comprising:
   receiving operation data related to the physical financial operation;
   obtaining a first biometric mathematical representation of a user, the first biometric mathematical representation being obtained from a first facial image of the user, the first facial image of the user being obtained upstream from where the physical financial operation is to be performed;
   storing an authorization dataset, comprising the first biometric mathematical representation and an operation mathematical representation representing operation data related to the physical financial operation, in one of a physical medium and an electronic device and the first biometric mathematical representation in an authorization dataset;
   receiving the authorization dataset at a capturing device without the user touching the capturing device;
   obtaining the operation mathematical representation and the first biometric mathematical representation from the received authorization dataset;
   capturing a second facial image of the user at the capturing device where the physical financial operation is to be performed;
   generating a second biometric mathematical representation of the user, the second biometric mathematical representation being obtained from the captured second facial image;
   determining a matching score by comparing the first biometric mathematical representation and the second biometric mathematical representation;
   responsive to the determined matching score satisfying a predefined threshold, authenticating an identity of the user upstream from where the physical financial operation is to be performed;
   obtaining the operation data from the operation mathematical representation;
   responsive to authenticating the identity of the user and determining that the operation data from the operation mathematical representation are satisfied, authorizing the physical financial operation at the capturing device without the user touching the capturing device.

2. The method according to claim 1, wherein the operation data comprises at least one of the elements:
   a timeslot to perform the operation; and/or
   an amount of money; and/or
   identification data of the capturing device to perform the operation; and/or
   a particular location area.

3. The method according to claim 2, wherein receiving operation data comprises receiving one or more elements of the operation data filled through a user interface.

4. The method according to claim 1, wherein the physical financial operation comprises withdrawing money from an automated teller machine.

5. The method according to claim 1, wherein the physical financial operation comprises withdrawing money of a remittance.

6. The method according to claim 1, wherein the first biometric mathematical representation is obtained from a database.

7. The method according to claim 1, further comprising: verifying a digital signature of the authorization dataset.

8. The method according to claim 1, wherein storing the authorization dataset comprises:
   generating a machine-readable optical label that carries the authorization dataset;
   providing the machine-readable optical label to the physical medium or electronic device.

9. The method according to claim 8, wherein generating a machine-readable optical label comprises:
   generating a two-dimensional barcode.

10. The method according to claim 9, wherein generating a two-dimensional barcode comprises generating a quick-response code.

11. The method according to claim 1, wherein the received second facial image of the user is captured through the capturing device.

12. The method according to claim 1, wherein the first or the second biometric mathematical representations are obtained from a first or second facial image of one or more users.

13. The method according to claim 1, further comprising:
   sending a confirmation of the physical financial operation once performed.

14. The method according to claim 13, further comprising:
   receiving a report on a fraud.

15. The method according to claim 2, wherein the capturing device is an automated teller machine.

16. A system for authorizing a physical financial operation, the system comprising a processor and a memory containing instructions which, when executed by the processor, perform the following:
   receiving operation data related to the physical financial operation;
   obtaining a first biometric mathematical representation of a user, the first biometric mathematical representation being obtained from a first facial image of the user, the first facial image of the user being obtained upstream from where the physical financial operation is to be performed;
   storing an authorization dataset, comprising the first biometric mathematical representation and an operation mathematical representation representing operation data related to the physical financial operation, in one of a physical medium and an electronic device and the first biometric mathematical representation in an authorization dataset;
   receiving the authorization dataset at a capturing device without the user touching the capturing device;
   obtaining the operation mathematical representation and the first biometric mathematical representation from the received authorization dataset;
   capturing a second facial image of the user at the capturing device where the physical financial operation is to be performed;
   generating a second biometric mathematical representation of the user, the second biometric mathematical representation being obtained from the captured second facial image;
   determining a matching score by comparing the first biometric mathematical representation and the second biometric mathematical representation;
   responsive to the determined matching score satisfying a predefined threshold, authenticating an identity of the user upstream from where the physical financial operation is to be performed;
   obtaining the operation data from the operation mathematical representation; and
   responsive to authenticating the identity of the user and determining that the operation data from the operation mathematical representation are satisfied, authorizing the physical financial operation at the capturing device without the user touching the capturing device.

17. A capturing device to be in data communication with a system for authorizing a physical financial operation, the device comprising a processor and a memory containing instructions which, when executed by the processor, perform the following:
   receiving operation data related to the physical financial operation;
   obtaining a first biometric mathematical representation of a user, the first biometric mathematical representation being obtained from a first facial image of the user, the first facial image of the user being obtained upstream from where the physical financial operation is to be performed;
   storing an authorization dataset, comprising the first biometric mathematical representation and an operation mathematical representation representing operation data related to the physical financial operation, in one of a physical medium and an electronic device and the first biometric mathematical representation in an authorization dataset;
   receiving the authorization dataset at a capturing device without the user touching the capturing device;
   obtaining the operation mathematical representation and the first biometric mathematical representation from the received authorization dataset;
   capturing a second facial image of the user at the capturing device where the physical financial operation is to be performed;
   generating a second biometric mathematical representation of the user, the second biometric mathematical representation being obtained from the captured second facial image;
   determining a matching score by comparing the first biometric mathematical representation and the second biometric mathematical representation;
   responsive to the determined matching score satisfying a predefined threshold, authenticating an identity of the user upstream from where the physical financial operation is to be performed;
   obtaining the operation data from the operation mathematical representation; and
   responsive to authenticating the identity of the user and determining that the operation data from the operation mathematical representation are satisfied, authorizing the physical financial operation at the capturing device without the user touching the capturing device.

18. The capturing device of claim 17 comprising an automated teller machine.

* * * * *